(12) United States Patent
Schlenkrich et al.

(10) Patent No.: US 11,288,596 B1
(45) Date of Patent: Mar. 29, 2022

(54) VIRTUAL X-RAY IMAGE (VXRI) STACK AS FEATURES SETS FOR MACHINE LEARNING FOR VIRTUAL SIMULATIONS

(71) Applicant: MSC.Software Corporation, Newport Beach, CA (US)

(72) Inventors: Michael Schlenkrich, Munich (DE); Matthias Dehmer, Munich (DE); Horen Kuecuekyan, Newport Beach, CA (US)

(73) Assignee: Hexagon Manufacturing Intelligence, Inc., Irvine, CA (US)

( * ) Notice: Subject to any disclaimer, the term of this patent is extended or adjusted under 35 U.S.C. 154(b) by 863 days.

(21) Appl. No.: 16/056,264

(22) Filed: Aug. 6, 2018

(51) Int. Cl.
*G06N 20/00* (2019.01)
*G06T 19/00* (2011.01)

(52) U.S. Cl.
CPC ............ *G06N 20/00* (2019.01); *G06T 19/00* (2013.01); *G06T 2219/00* (2013.01)

(58) Field of Classification Search
CPC ........ G06N 20/00; G06N 20/10; G06N 20/20; G06T 19/00
See application file for complete search history.

(56) References Cited

U.S. PATENT DOCUMENTS

2017/0372480 A1* 12/2017 Anand ................ G06T 19/20
2018/0082487 A1* 3/2018 Kiraly ................ G06N 20/00
2019/0216409 A1* 7/2019 Zhou .................. G06T 7/11
2019/0261945 A1* 8/2019 Funka-Lea ........ A61B 5/1128

OTHER PUBLICATIONS

Pawlus, Witold, Hamid Reza Karimi, and Kjell G. Robbersmyr. "Data-based modeling of vehicle collisions by nonlinear autoregressive model and feedforward neural network." Information Sciences 235 (2013): 65-79. (Year: 2013).*
Chowdhury, Sushmit, Kunal Mhapsekar, and Sam Anand. "Part build orientation optimization and neural network-based geometry compensation for additive manufacturing process." Journal of Manufacturing Science and Engineering 140.3 (2018). (Year: 2018).*
Papadrakakis, Manolis, Vissarion Papadopoulos, and Nikos D. Lagaros. "Structural reliability analyis of elastic-plastic structures using neural networks and Monte Carlo simulation." Computer methods in applied mechanics and engineering 136.1-2 (1996): 145-163. (Year: 1996).*

* cited by examiner

*Primary Examiner* — King Y Poon
*Assistant Examiner* — Vincent Peren
(74) *Attorney, Agent, or Firm* — Foley & Lardner LLP

(57) ABSTRACT

Examples described herein relate to apparatuses and methods for determining a training set for an AI of a computerized simulation platform. An image stack corresponding to a 3D structure includes a plurality of layers generated based on the 3D structure. A model of the 3D structure is simulated to determine simulation results. The training set for a machine learning algorithm of the AI includes the image stack and the simulation results. The AI is trained using the machine learning algorithm based on the training set.

19 Claims, 6 Drawing Sheets

VIRTUAL X-RAY IMAGE (VXRI) STACK AS FEATURE SETS FOR MACHINE LEARNING FOR VIRTUAL SIMULATIONS

BACKGROUND

Conventional product development process includes computation of performance attributes of products based on 3D simulations. 3D simulations are resource-intensive, especially for modeling products (e.g., building a simulation model) and performing all required simulations. As such, efforts involved in setting up the simulations, running the simulations, and analyzing the results require significant time and computing resources. Accordingly, 3D simulations prolong the product development process in its current state.

Conventional methods for creating a training set for machine learning are lacking in various aspects. For example, using parameters (such as a position, a length, width, height, radius, thickness, and the like) that define specific design features as training data is strictly dependent on an underlying topology of a 3D structure. Due to the fact that topologies can be highly complex and very different among products, this approach is very limited even with modifications to the development process. In addition, voxel representations of a 3D topological structure are also not promising because the number of voxels needed to resolve all relevant features of the 3D topological structure can be significant enough such that the process can become unmanageable. Furthermore, parameterizing (fitting) simplified models has limited success because only correlations that "survive" the parameterization can be modeled into the simplified model.

SUMMARY OF THE INVENTION

In some arrangements, a method for determining a training set for an AI of a computerized simulation platform includes generating an image stack corresponding to a 3D structure, wherein the image stack includes a plurality of layers generated based on the 3D structure, simulating a model of the 3D structure to determine simulation results, determining the training set for a machine learning algorithm of the AI, wherein the training set includes the image stack and the simulation results, and training the AI using the machine learning algorithm based on the training set.

In some arrangements, training the AI using the machine learning algorithm based on the training set includes providing the training set to the machine learning algorithm to identify correlations between the image stack and the simulation results.

In some arrangements, each of the plurality of layers is represented by a 2D value matrix. In some arrangements, each value in the 2D value matrix corresponds to a pixel. In some arrangements, the 2D value matrix is visualized as a monochrome image or color-coded by scaling values in the 2D value matrix.

In some arrangements, each of the plurality of layers is generated from a same perspective via a same origin.

In some arrangements, generating the image stack corresponding to the 3D structure includes projecting a ray through each grid point on a grid plane to the 3D structure. In some arrangements, each grid point corresponds to a same matrix location on each of the plurality of layers.

In some arrangements, each of the plurality of layers corresponds to one of a depth measurement, a material property, or an impact angle.

In some arrangements, generating the image stack corresponding to the 3D structure includes generating at least one first layer corresponding to a depth measurement by integrating a weighted material property along a ray originating from an origin outside of the 3D structure through a grid point on an grid plane, from a predefined starting point to a predefined end point, to determine an integration result, in response to determining that the integration result exceeds a threshold, setting a value of the first layer that corresponds to the grid point as a z-value, and in response to determining that the integration result does not exceed the threshold, setting a value of the first layer that corresponds to the grid point as a default value.

In some arrangements, generating the image stack corresponding to the 3D structure includes generating at least one first layer corresponding to a depth measurement based on a linear combination of other layers that indicate depth measurements.

In some arrangements, generating the image stack corresponding to the 3D structure includes generating at least one first layer corresponding to a material property by integrating a weighted material property along a ray originating from an origin outside of the 3D structure through a grid point on a grid plane, from a predefined starting point to a predefined end point.

In some arrangements, generating the image stack corresponding to the 3D structure includes generating at least one first layer corresponding to an impact angle based on a normal vector with respect to a surface at a location defined by corresponding location on the first layer corresponding to a depth measurement.

In some arrangements, generating the image stack corresponding to the 3D structure includes generating at least one first corresponding to an impact angle based on a normal vector with respect to a surface at a location defined by corresponding location on a first layer corresponding to a depth measurement.

In some arrangements, generating the image stack corresponding to the 3D structure includes generating at least one first layer corresponding to an impact angle based on a first delta with respect to a first axis and a normal vector with respect to a surface at a location defined by corresponding location on a first layer, the first layer corresponds to a depth measurement, and generating a fourth layer corresponding to the impact angle based on a second delta with respect to a second axis and the normal vector with respect to the surface at the location defined by the corresponding location on the first layer, the first layer corresponds to a depth measurement.

In some arrangements, the image stack is generated based on material properties, depths, and impact angles that affect the simulation results.

In some arrangements, each matrix location in one of the plurality of layers is aligned to a corresponding matrix location in another one of the plurality of layers.

In some arrangements, the method further includes predicting simulation results for another 3D structure using the AI.

In some arrangements, non-transitory computer-readable medium having computer-readable instructions, such that when executed, causes a processor to determine a training set for an AI of a computerized simulation platform by generating an image stack corresponding to a 3D structure, wherein the image stack includes a plurality of layers generated based on the 3D structure, simulating a model of the 3D structure to determine simulation results, determining the training set for a machine learning algorithm of the AI, wherein the training set includes the image stack and the simulation results, and training the AI using the machine learning algorithm based on the training set.

In some arrangements, each of the plurality of layers is represented by a 2D value matrix. In some arrangements, each value in the 2D value matrix corresponds to a pixel. In some arrangements, the 2D value matrix is visualized as a monochrome or color-coded image by scaling values in the 2D value matrix.

In some arrangements, each of the plurality of layers corresponds to one of a depth measurement, a material property, or an impact angle.

In some arrangements, each matrix location in one of the plurality of layers is aligned to a corresponding matrix location in another one of the plurality of layers.

In some arrangements, a computerized simulation platform configured to determine a training set for an AI, the computerized simulation platform includes a processing circuit configured to generate an image stack corresponding to a 3D structure, wherein the image stack includes a plurality of layers generated based on the 3D structure, simulate a model of the 3D structure to determine simulation results, determine the training set for a machine learning algorithm of the AI, wherein the training set includes the image stack and the simulation results, and train the AI using the machine learning algorithm based on the training set.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
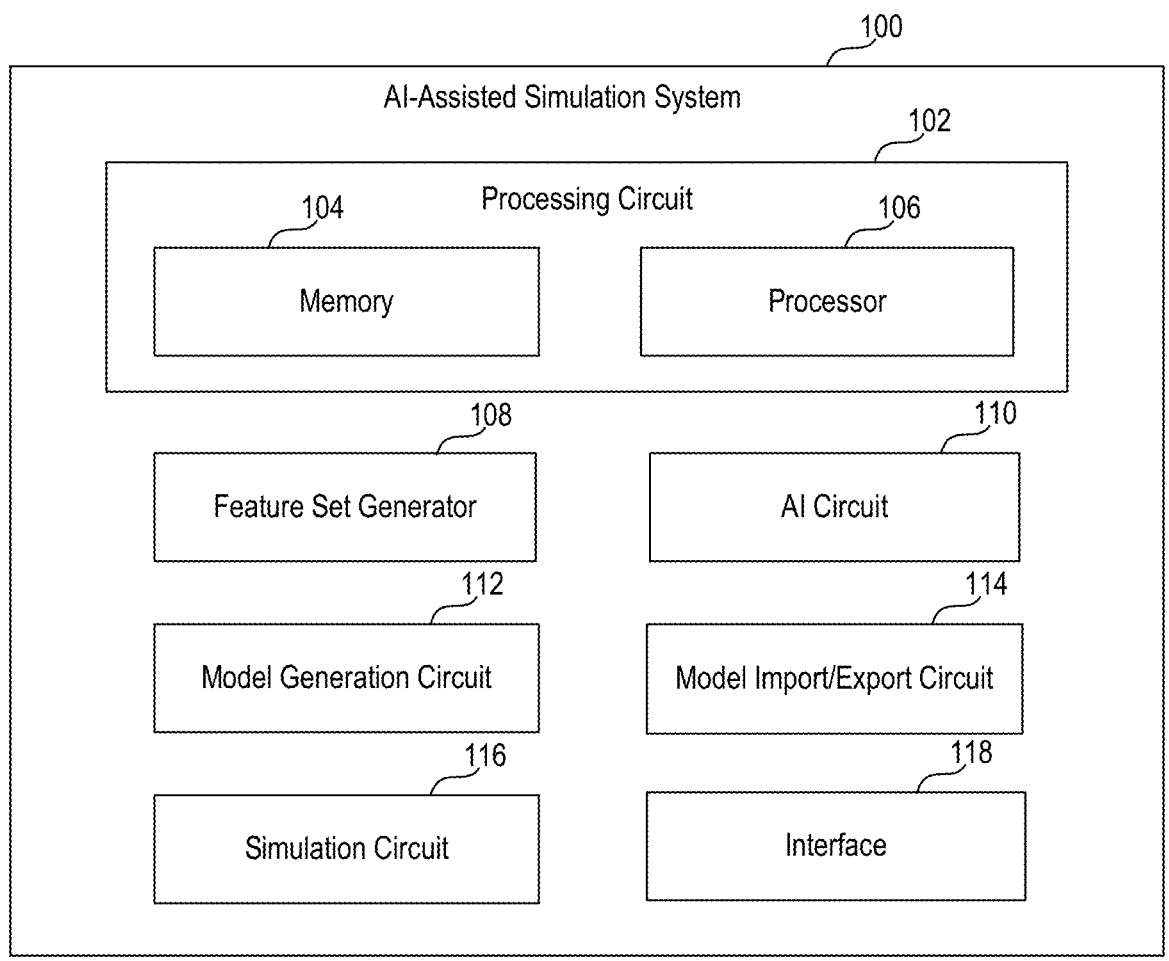
FIG. 1 is a block diagram illustrating an example of an AI-assisted simulation system capable of predicting simulation results according to various arrangements.

The detailed description set forth below in connection with the appended drawings is intended as a description of various aspects of the present disclosure and is not intended to represent the only aspects in which the present disclosure can be practiced. Each aspect described in this disclosure is provided merely as an example or illustration of the present disclosure, and should not necessarily be construed as preferred or advantageous over other aspects. The detailed description includes specific details for providing a thorough understanding of the present disclosure. However, it will be apparent to those skilled in the art that the present disclosure can be practiced without these specific details. In some instances, structures and devices are shown in block diagram form in order to avoid obscuring the concepts of the present disclosure. Acronyms and other descriptive terminology can be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more aspects.

Arrangements described herein relate to apparatuses, systems, methods, and non-transitory computer-readable medium for predicting outcomes of 3D simulations using machine learning. For example, reaching an outcome using 3D simulations may include setting up Finite Element Method (FEM) simulation models (e.g., pre-processing), running simulations (e.g., solving), and analyzing results (e.g., post-processing). The arrangements herein relate to a mechanism to predict, at least partially, 3D simulation results instead of performing the 3D simulations. In addition, the predictions can be frontloaded in the product development and/or design process because an operator does not need to wait for the 3D simulations to be completed to gain insights therefrom. As such, errors can be avoided much earlier in the development and/or design process. By predicting the outcomes of the 3D simulations, a number of simulations needed to reach the outcomes can be reduced, thus conserving time and cost associated with executing the simulations. Accordingly, creating a predictive model via machine learning is a very promising way to fully or partially eliminate the time and resources used in the 3D simulation processes.

The arrangements described herein relate to creating an appropriate feature/training set for the machine learning algorithm to allow the intelligent system (e.g., Artificial Intelligence (AI)) to correctly and efficiently identify correlations between complex 3D geometrical structures (along with associated material properties) and simulation results. Although structural 3D simulations using FEM and impact simulations (e.g., automotive crash simulations) are used throughout this disclosure, one of ordinary skill in the art can appreciate that the disclosed arrangements can be likewise implemented for other types of simulations (e.g., Computational Fluid Dynamics (CFD) and Multibody Simulation (MBS)) or applications.

Referring generally to the FIGS., arrangements described herein relate to extracting a feature set from a 3D structure, where the feature set is referred to as a Virtual X-Ray Image Stack (VXRI stack). The VXRI stack efficiently captures features of the 3D structure and local material properties of components of the 3D structure. One or more VXRI stacks (without the need of further input data) can be used as a feature set for training a prediction model in a machine learning process.

In some arrangements, a VXRI stack is completely independent from a manner in which the 3D structure is defined. By using the VXRI stack as the feature/training set, extractions of parameters (e.g., sheet thicknesses, distances between design features, and the like) of design features from the 3D structure is not needed. Therefore, the disclosed arrangements are independent from how the 3D structure is modeled. Thus, the VXRI stack can be applied to a variety of models, including but not limited to, Computer Aided Design (CAD) models (geometric models) and finite element meshes. In some arrangements, all VXRIs in a VXRI stack are aligned to each other as a same ray path is used for corresponding image point/pixel locations on the VXRIs. The alignment of the VXRIs in the VXRI stack allows a machine learning algorithm to easily detect correlations between individual features extracted with a VXRI. In some arrangements, setting up or otherwise generating the VXRI stack depends on material properties that affect simulation results, at least one spatial zone that contributes to the simulation results, and a perspective based on which the VXRIs are generated. In some examples, each VXRI stack includes VXRIs generated from a same perspective. The representation of the features as VXRIs efficiently exploits image-based machine learning methods. The combination of all VXRI in a VXRI stack enables machine learning to detect correlations between the specific characteristics of the stack layers.

Each VXRI stack is generated from a same angle/perspective and pixel resolution. In some arrangements, multiple VXRI stacks that are generated from different angles/perspectives and pixel resolutions can be used as a feature set. Each VXRI stack is created by a variable amount of individual 2D value metrics that can be referred to herein as layers or VXRIs of the VXRI stack. A 2D value matrix (or layer) corresponding to a VXRI can be visualized as an image by scaling values in the 2D matrix to a luminance value of the image to obtain a monochrome or color-coded image. The individual values of the 2D matrix correspond to pixels on the image. The individual values of the 2D matrix can be generated with ray-tracing as described herein. The number of layers varies depending on application area, an amount of different material properties that contribute to simulation results, and z-values extracted from the structure.

In one example, an order of the layers may not be relevant. In another example, the order of the layers may influence a convergence of the ML-algorithm. In either example, the orders of layers for all VXRI stacks generated with respect to a given application or feature set for training are identical. As described, each layer of a VXRI stack is associated with a type, which corresponds to a criteria based on which each layer is generated. Examples of the criteria include but are not limited to, depth (distances in z-direction) and material properties. In an example in which a VXRI stack is arranged in an order such as: a first layer for a first depth, a second layer for a second depth, a third layer for a first material property, a fourth layer for a second material property, a fifth layer for a third material property, and a sixth layer of a fourth material property, all layers in VXRI stacks of a same feature set are arranged in the same order. This allows consistency when training the AI.

FIG. 1 is a block diagram illustrating an example of an AI-assisted simulation system 100 according to various arrangements. Referring to FIG. 1, the AI-assisted simulation system 100 includes at least a processing circuit 102, a feature set generator 108, an AI circuit 110, a model generation circuit 112, a model import/export circuit 114, a simulation circuit 116, and an interface 116 for implementing features described herein. In some arrangements, the AI-assisted simulation system 100 is a part of a workstation computer or another suitable computing device. The AI-assisted simulation system 100 may include other devices such as but not limited to, a network system, wireless or wired communications system, printers, and/or the like not shown for brevity.

The processing circuit 102 includes a memory 104 and a processor 106. The processor 106 includes any suitable data processing device, such as a general-purpose processor (e.g., a microprocessor). In the alternative, the processor 106 can be any conventional processor, controller, microcontroller, or state machine. The processor 106 can be implemented as a combination of computing devices, e.g., a combination of a Digital Signal Processor (DSP) and a microprocessor, a plurality of microprocessors, at least one microprocessor in conjunction with a DSP core, or any other such configuration. For example, the processor 106 may be, but is not limited to being, an Intel® designed processor, AMD® designed processor, Apple® designed processor, QUALCOMM® designed processor, or ARM® designed process.

The memory 104 (or storage device) can be operatively coupled to the processor 106 and can include any suitable device for storing software instructions and data for controlling and use by the processor 106 to perform operations and functions described herein. Examples of the memory 104 include, but not limited to, Random Access Memory (RAM), Read Only Memory (ROM), floppy disks, hard disks, dongles or other Recomp Sensor Board (RSB) connected memory devices, or the like. The memory 104 can include non-transitory storage media that is configured to store information and instructions pertinent to the operation of the processor 106.

The memory 104 can send data to or receive data from the processor 106 and/or each of the circuits/components 108-118 in the AI-assisted simulation system 100. In some examples, the memory 104 can be a remote storage device that stores data for the AI-assisted simulation system 100 (or only the processing circuit 102) in a different node of a network than that on which the processing circuit 102 and/or the AI-assisted simulation system 100 reside. In some examples, the memory 104 can be located on the same computer system (e.g., within the same node of the network) as the processing circuit 102 and/or the AI-assisted simulation system 100. In some examples, one or more of the circuits 108-118 can be implemented with a dedicated memory unit that is separate from the memory 104.

The processing circuit 102 can implement or otherwise provide processing capabilities to one or more of the circuits 108-118 in the AI-assisted simulation system 100 for performing the features described herein. For example, the processing circuit 102 can implement the feature set generator 108 to generate feature sets for training an AI (implemented by the AI circuit 110). The feature set generator 108 can generate a feature set that includes one or more VXRI stacks, each VXRI includes one or more layers defined in the manner described.

The processing circuit 102 can implement the AI circuit 110. The AI circuit 110 is configured to provide an AI that can accept a 3D structure of a model therefore as input and output predicted simulation results corresponding to the 3D structure or the model. The AI circuit 110 can predict simulation results for structural 3D simulations (e.g., FEM and impact simulations), CFD, MBS, and the like. The AI circuit 110 may include suitable memory devices for storing one or more suitable predictive models based on which the AI circuit 110 predicts the simulation results. The predictive models can be trained using a machine learning algorithm based on the feature set generated by the feature set generator 108 and corresponding simulation results. In that regard, the AI circuit 110 includes or otherwise implements the machine learning algorithm.

The processing circuit 102 can implement the model generation circuit 112. The model generation circuit 112 receives user input from the interface 118 and converts the user input into a model to be simulated by the simulation circuit 116. The model generation circuit 112 can generate a CAD model, a finite element model, and the like.

In addition, the processing circuit 102 can implement the model import/export module 114 to import and/or export models. In some examples, the model import/export module 114 imports a model from another memory device or another system. The model import/export module 114 can send model information corresponding to the imported model to one or more of the circuits/components 108-112 and 116-118 in the AI-assisted simulation system 100. The model import/export module 114 can export the model to a memory device or another system. The model import/export module 114 can export the model via a suitable computer network to a machine to automatically manufacture products represented by the model.

Furthermore, the processing circuit 102 can implement the simulation circuit 116. For example, the simulation circuit 116 can receive a model from the model generation circuit 112 and/or the model import/export circuit 114 to perform simulations thereof. The simulations that can be performed by the simulation circuit 116 include but are not limited to, structural 3D simulations (e.g., FEM and impact simulations), CFD, MBS, and the like.

The interface 118 can include at least one input device for receiving user input from a user and at least one display device for outputting information to the user. For example, the input device can include a computer with a monitor, keyboard, keypad, mouse, joystick, touch screen display, or other input devices performing a similar function. The keyboard can include alphanumeric and other keys, and can be connected to processing circuit 102 for communicating information and command selections. The input device can include a touch screen interface or movement sensing interface that can be combined with, or separated from, the display device of the interface 118. The input device can include a cursor control device, such as, but not limited to, a mouse, trackball, touch screen, motion sensor, cursor direction keys, and the like. Such input device can control cursor movement on the display device. The display device of the interface 118 can be any type of display (e.g., Cathode Ray Tube (CRT) display, Liquid Crystal Display (LCD), etc.) configured to provide audio and/or visual output to the user.

Figure 2:
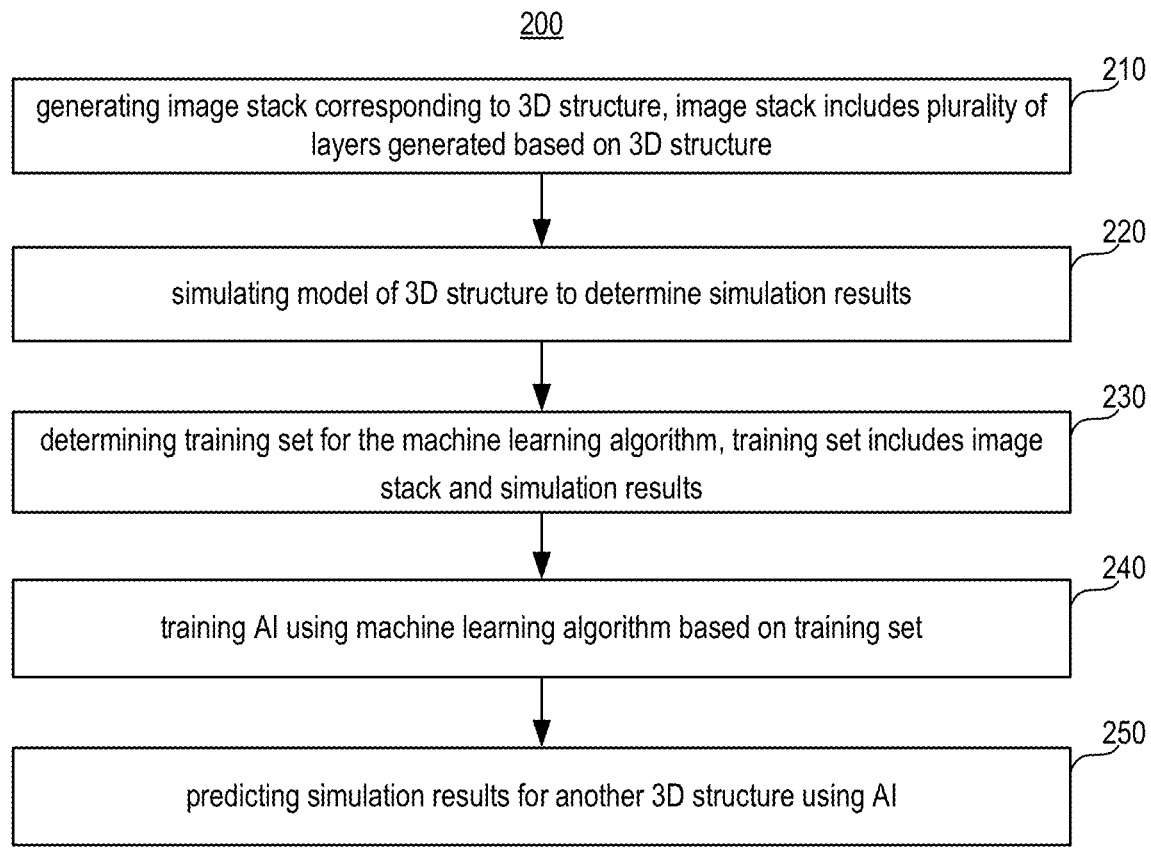
FIG. 2 is a process flow diagram illustrating a method for training an AI and predicting simulation results according to various arrangements.

FIG. 2 is a process flow diagram illustrating a method 200 for training an AI and predicting simulation results according to various arrangements. Referring to FIGS. 1-2, the method 200 can be implemented using the AI-assisted simulation system 100. Blocks 210-240 relate to training an AI provisioned by the AI circuit 110 using a feature set created by the feature set generator 108. Block 250 relates to predicting simulation results using the trained AI. While a feature set includes a VXRI stack as described, one of ordinary skill in the art can appreciate that two or more features sets or a feature set including two or more VXRI stacks can be likewise implemented.

At 210, the feature set generator 108 generates an image stack (e.g., a VXRI stack) corresponding to a 3D structure. The VXRI stack includes multiple layers generated based on the 3D structure. The VXRI stack is referred to as a feature set as the VXRI stack is indicative of features (e.g., depths and material properties) of the 3D structure. Each layer is represented by a 2D value matrix. Each value in the 2D value matrix corresponds to a pixel. The 2D value matrix can be is visualized as a monochrome or color-coded image by scaling values in the 2D value matrix. Each layer is generated from a same perspective via a same origin.

At 220, the simulation circuit 116 simulates a model of the 3D structure to determine simulation results. At 230, AI circuit 110 determines a training set for a machine learning algorithm. The training set includes the image stack (the feature set) and the simulation results.

At 240, the AI circuit 110 trains the AI using the machine learning algorithm based on the training set. Training the AI using the machine learning algorithm based on the training set includes, for example, providing the training set to the machine learning algorithm associated with the AI circuit 110 to identify correlations between the image stack and the simulation results.

At 250, the AI circuit 110 predicts simulation results for another 3D structure using the AI associated with the AI circuit 110.

Figure 3:
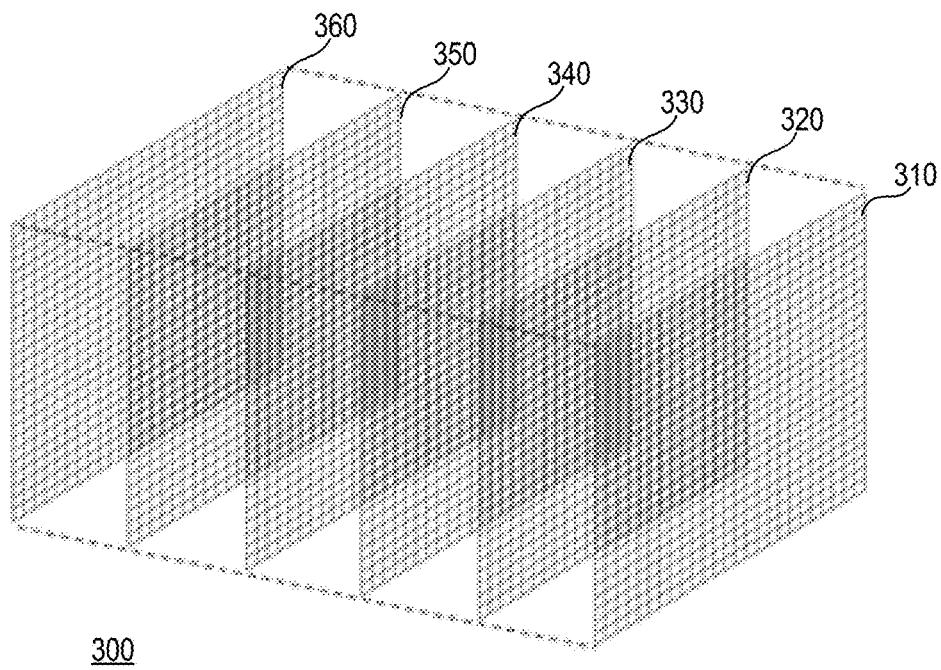
FIG. 3 is a diagram illustrating a VXRI stack according to various arrangements.

FIG. 3 is a diagram illustrating a VXRI stack 300 according to various arrangements. Referring to FIGS. 1-3, the VXRI stack 300 is an example of the image stack created at 210. The VXRI stack 300 includes layers 310-360. While 6 layers are shown, one of ordinary skill in the art can appreciate that more or fewer layers can be present in a VXRI stack. As shown, each of the layers 310-360 is an image matrix having pixels values. The layers 310-360 are aligned to each other because a same ray path is used for corresponding pixel matrix locations on the layers 310-360. Each of the layers 310-360 is generated based on a corresponding specific feature (e.g., depth or material property). The alignment of the layers 310-360 allows a machine learning algorithm to easily detect correlations between an individual feature (e.g., depth or material property) and simulation results such as specific key performance values computed by 116.

The layers 310-360 of the same VXRI stack 300 are generated from a same perspective. That is, a same ray path is used for a same matrix location of each of the layers 310-360 in the VXRI stack 300. For example, a perspective for all layers 310-360 of the VXRI stack 300 can be defined by a camera origin $\vec{O}$ and a grid-plane with N×M grid points $\vec{P}_{ij}$. In a ray-tracing process for generating the VXRI stack 300, rays are projected from the origin $\vec{O}$ through the grid-plane to the 3D structure. Each ray $\vec{r}_{ij}(z)$ defines a straight path from the origin $\vec{O}$ to a grid point $\vec{P}_{ij}$. Thus, generating the VXRI stack 300 corresponding to the 3D structure includes projecting a ray through each grid point on a grid plane to the 3D structure. Each grid point corresponds to a same pixel location on each of the layers 310-360. In one example, a ray path can be defined by expression (1):

$$\vec{r}_{ij}(z) = \vec{P}_{ij} + z * \frac{\vec{P}_{ij} - \vec{O}}{|\vec{P}_{ij,s} - \vec{O}|} \tag{1}$$

The grid point $\vec{P}_{ij}$ can be defined by expression (2):

$$\vec{P}_{ij} = \vec{P}_0 + i * \overrightarrow{\Delta x} + j * \overrightarrow{\Delta y} \tag{2}$$

Δx and Δy are pixel size or spacing in a x-direction and y-direction, respectively. In one example, each of Δx and Δy is 1 cm for each of the layers 310-360 that has a size of 50 pixels by 50 pixels. In that example, each of the layers 310-360 is represented by a stencil of 50 cm by 50 cm. As shown in expression (1), if the distance between $\vec{O}$ and the 3D structure (created by the model generation circuit 112 and the model import/export circuit 114) is infinite, all rays are parallel to each other. This may be the most common situation. $\vec{P}_{ij}$, which defines a grid point and a location of a pixel i,j for all layers 310-360 in the VXRI stack 300. In the examples in which there are multiple VXRI stacks (each of which is a VXRI such as but not limited to, the VXRI stack 300), then they differ in this respect. In particular, the differences include a view angle of the 3D structure. In case of impact simulations in which an impactor "crashes" into the 3D structure from a specific direction, layers of a stack may be generated from the impact direction. On the other hand, for a simulation without any bias for a specific direction, stacks may be generated from multiple origins or directions, with the layers of a same stack being generated from a same origin or direction. In some arrangements, the grid plane is typically aligned with an outer surface of the 3D structure. In some arrangements, the grid plane is between origin $\vec{O}$ and the 3D structure.

Figure 4:
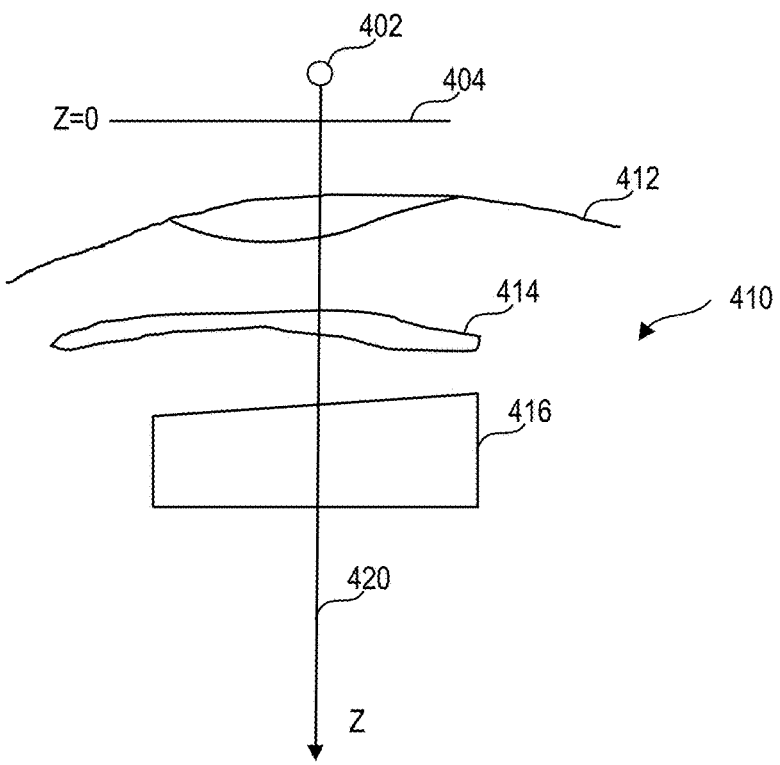
FIG. 4 is a diagram illustrating ray-tracing according to various arrangements.

FIG. 4 is a diagram illustrating ray-tracing according to various arrangements. Referring to FIGS. 1-4, a structure 410 is shown to have components 412, 414, and 416. The component 412 is a sheet with a thickness. The components 414 and 416 are solids. A grid plane 404 is defined to be between an origin $\vec{O}$ 402 and the structure 410. A ray $\vec{r}_{ij}(z)$ 420 defines a straight path from the origin $\vec{O}$ 402 to a grid point $\vec{P}_{ij}$ on the grid plane 404. The ray $\vec{r}_{ij}(z)$ 420 traverses the components 412, 414, and 416.

Within the product there is an option that the ray experiences refraction. This will result in a segmented ray. The segments are defined by the individual refracting surface.

Each of the layers 310-360 (generally referred to as a layer s) can be represented as a 2D value matrix. For example, $V_{ij,s}$ represents a value of an element i,j of one of the layers 310-360. In some examples, each of the layers 310-360 is unique and represents a feature of the 3D structure. As described, a feature can either be an integral of a material property of a z-range or a z-value representing some depth into the 3D structure. Each of the layers 310-360 can be defined by a VXRI type and settings (e.g., parameters) for the VXRI type.

Each of the layers 310-360 in the VXRI stack 300 can be generated by one of three different methods by which an individual matrix element $V_{ij,s}$ making up each of the layers 310-360 can be determined. $V_{ij,s}$ is the value of an ij-element of a matrix for a layers. The value $V_{ij,s}$ of an individual matrix element can be determined by traversing along a corresponding ray $\vec{r}_{ij}(z)$.

A first type of VXRI elements is indicative of depth measurements. This type of VXRI elements is similar to a z-buffer in computer graphics. A VXRI element of the first type can be referred to as $V_{ij,s}^Z$, which is a feature based on a z-value. That is, $V_{ij,s}^Z$, is indicative of a specific distance along the ray $\vec{r}_{ij}(z)$, which can be used by the two other features as a look-up. In some arrangements, $V_{ij,s}^Z$ can be generated using one of at least two methods.

In a first method for determining $V_{ij,s}^Z$, a given weighted material property is integrated along the path of a ray $\vec{r}_{ij}(z)$ from a predefined starting point $z_s^{start}$ to a predefined end point $z_s^{end}$. In an example in which the material property is material density, assuming that no weighting is applied, each matrix-value represents an integral over the z-distance. If each matrix-value is scaled (e.g., multiplied) by Δx*Δy, the resulting matrix-value represents a mass of the 3D structure with respect to that matrix-value. On the other hand, assuming that weighting is applied, the density closest to z=0 is more pronounced. The deeper inside of the structure, the lesser the calculated mass is. A result is that the matrix-value is higher if the materials with the same densities are closer to the surface of the 3D structure. The weighted material property can be integrated, for example, using expression (3):

$$C_s\{z\} = \int_{z_s^{start}}^{z} W_s(z' - z_s^{start}) * M_s(\vec{r}_{ij}(z')) * dz' \tag{3}$$

$W_s(z')$ is a weighting function for a layers. In some examples, $W_s(z')$ may be optional (e.g., $W_s(z')=1$). $M_s(\vec{r}_{ij,s}(z'))$ defines a specific material property at location $\vec{r}_{ij}(z')$ for the layer s. In some instances, $z_s^{start}$ may be simplified as 0.

Figure 5:
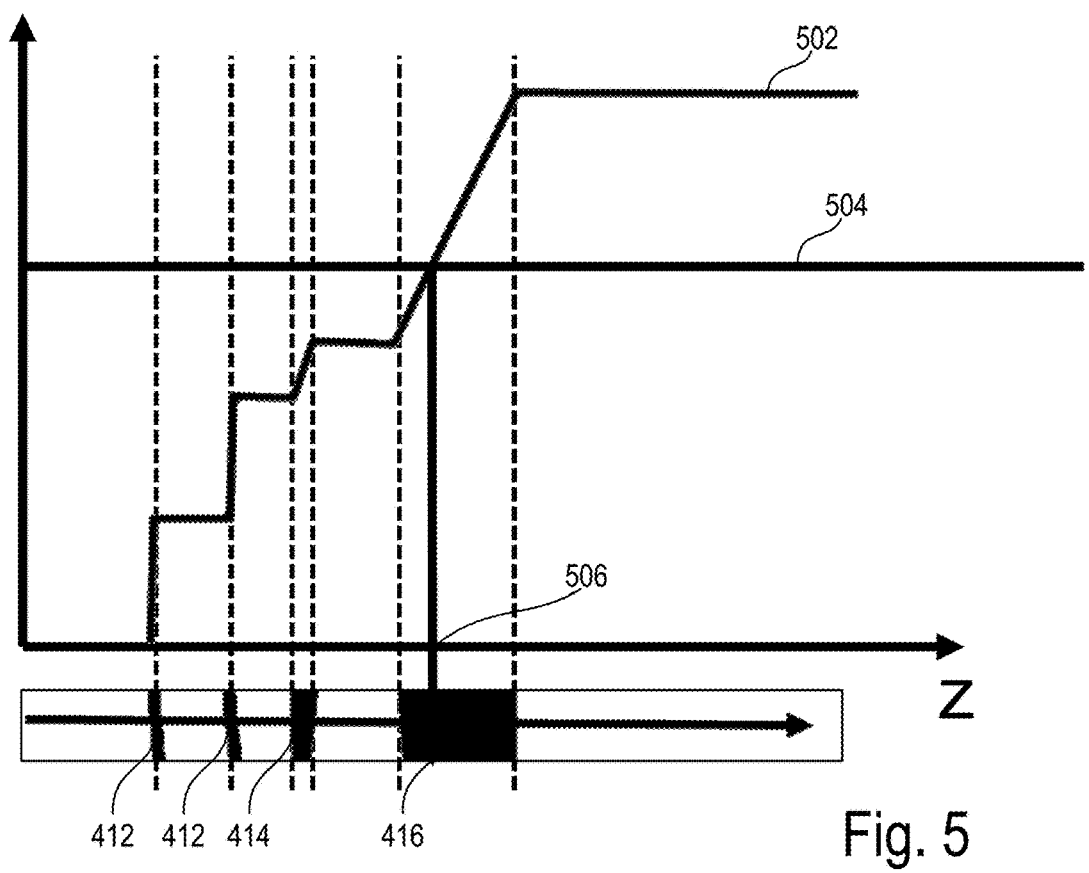
FIG. 5 is a diagram illustrating depth measurements according to various arrangements.

FIG. 5 is a diagram illustrating depth measurements according to various arrangements. Referring to FIGS. 1-5, a graph 502 of $C_s\{z\}$ is shown for the structure 410, for example, with respect to at least components 412, 414, and 416. The graph 502 is determined without weighting (e.g., $W_s(z')=1$). $z_s^{start}$ is simplified as 0. As shown, the graph 502 at z-values corresponding to the component 412 include step functions that correspond to the fact that the component 412 includes two sheets. The graph 502 at z-values corresponding to the components 414 and 416 include linear functions that correspond to the fact that the components 414 and 416 are solids. A pre-defined threshold ($C_{threshold,s}$) is shown to intersect the graph 502 at z-value 506.

Responsive to determining that the criteria $C_s\{z\}$, which is the result of the integration, exceeds the pre-defined threshold ($C_{threshold,s}$), e.g., $C_s\{z\} > C_{threshold,s}$, the $V_{ij,s}^Z$, value is set to the z-value 506 (e.g., $V_{ij,s}^Z = z$), where this happened. In an example in which an impactor having a specific energy crashes into the 3D structure, engineers can estimate from experience that the impact may deform sheet metals with an accumulated density of $C_{threshold,s}$. Thus, setting $C_{threshold,s}$ as the estimated accumulated density can provide a rough estimate at each pixel-location for the z-value corresponding to a depth that the impactor penetrates. On the other hand, responsive to determining that the criteria $C_s\{z\}$ does not exceed a pre-defined threshold ($C_{threshold,s}$), the $V_{ij,s}^Z$ is value is set to a default value ($V_{ij,s}^Z$=default). Typically, the default value is set to the largest possible z-value. Thus, a key usage of z-value based feature $V_{ij,s}^Z$, is to determine where a ray $\vec{r}_{ij}(z')$ hits a specific surface. Such information can be used for determining the $V_{ij,s}^\alpha$ impact angle feature.

In a second method for determining $V_{ij,s}^Z$, $V_{ij,s}^Z$ can be computed as a linear combination of other $V_{ij,s}^Z$. For instance, if a first z-value corresponds to penetration with a very low threshold to represent a soft shell of the 3D structure and a second z-value corresponds to penetration of a very hard solid, then the differences of the first z-value and the second z-value defines a buffer depth available for absorbing the impact, allowing the impactor to deaccelerate. The second method can determine $V_{ij,s}^Z$, using expression (4):

$$V_{ij,s}^Z = \sum_{n=1}^{s-1} a_n * V_{ij,n}^Z \quad (4)$$

A second type of VXRI elements is indicative of a weighted integral of a specific material property value over a specified distance into the 3D structure. In some arrangements, a layer s corresponds to one material property. In other arrangements, a layer s corresponds to a linear combination of two or more material properties. For example, a layer s may correspond to an average (mean or median) of anisotropic material properties. A VXRI including elements of the second type, when visualized as a monochrome image, is similar to X-ray images. An element of the second type can be referred to as $V_{ij,s}^M$, which is a feature based on a material property. As such, $V_{ij,s}^M$ is a weighted integral of a specific material property attribute as traversed through the 3D structure, along the ray $\vec{r}_{ij}(z)$.

Figure 6:
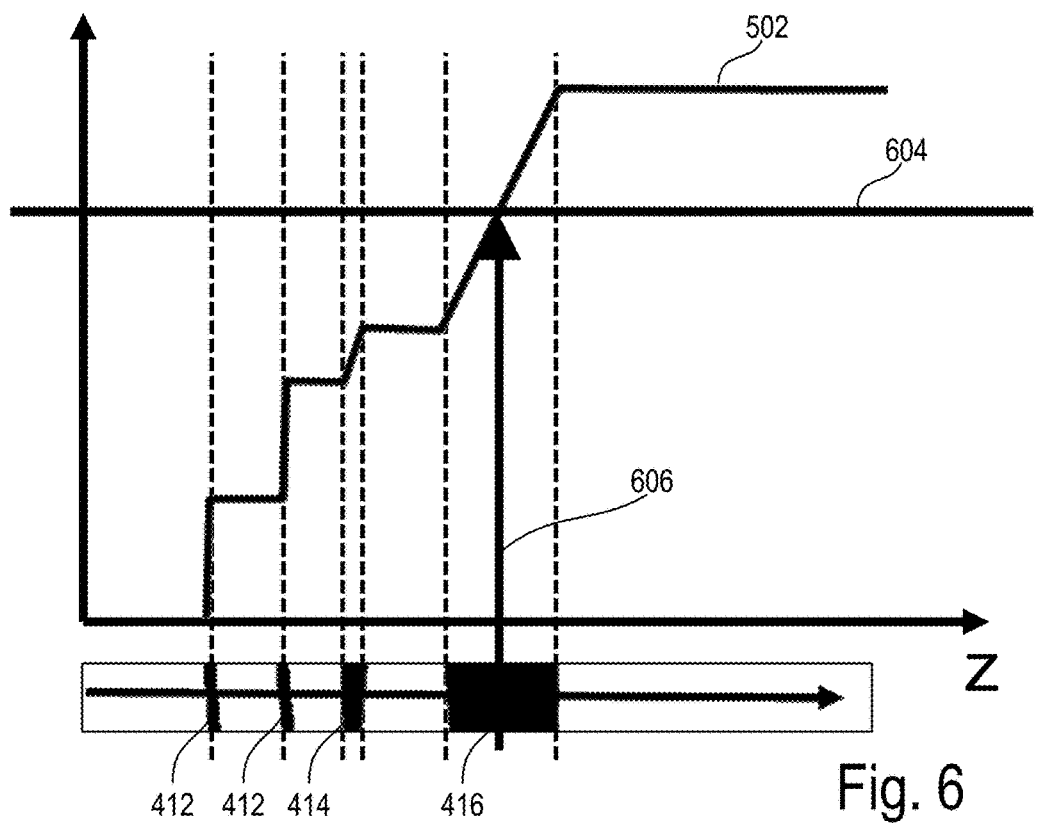
FIG. 6 is a diagram illustrating integration over a material property according to various arrangements.

FIG. 6 is a diagram illustrating integration over a material property according to various arrangements. Referring to FIGS. 1-6, the graph 502 of $C_s\{z\}$ is shown for the structure 410, for example, with respect to at least components 412, 414, and 416. As described, the graph 502 is determined without weighting (e.g., $W_s(z')=1$). $z_s^{start}$ is simplified as 0. The graph 502 at $z_s^{end}$ 606 is $V_{ij,s}^M$.

For example, the integration can be performed using expression (5):

$$V_{ij,s} = \int_{z_{ij,start}}^{z_{ij,end}} W_s(z - z_{ij,start}) * M_s(\vec{r}_{ij}(z)) * dz \quad (5)$$

$W_s(z)$ is the weighting function of layer s, and $M_s(\vec{r}_{ij}(z))$ defines a specific material property at location $\vec{r}_{ij}(z)$ for the layers. In some examples, $W_s(z)$ may be optional (e.g., $W_s(z)=1$). In some arrangements, $z_{ij,start}$ and $z_{ij,end}$ can be set based on two approaches. In a first approach, $z_{ij,start}$ and $z_{ij,end}$ are both constants (e.g., $z_{s,start}$ and $z_{s,end}$, respectively, for a given layer s). In an example, an impactor on average may penetrate approximately 10 cm into a 3D structure. Integrating over a material property such as density allows generation of a layer s that is indicative of an amount of material in the penetrated 10 cm. Such features allow the machine learning algorithm to separate different types of impact situations. The 10 cm estimation may not be a parameter of a product feature, but may be a parameter deducted for experience of past simulations. In a second approach, $z_{ij,start}$ and $z_{ij,end}$ can be taken from a z-value based feature $V_{ij,s}^Z$. In that regard, $z_{ij,start}$ and $z_{ij,end}$ can be $V_{ij,s'}^Z$ and $V_{ij,s''}^Z$, respectively.

In some examples, $z_{ij,s}^0$ is the z-value at which the ray $\vec{r}_{ij,s}(z)$ contacts the 3D structure for the first time. A depth of penetration of the ray $\vec{r}_{ij,s}(z)$ into the 3D structure can be determined based on $z_{ij,s}^0$. In some examples, the weighting function $W_{ij,s}(z)$ can be a step function, defined by expression (6):

$$W_{ij,s}(z) = \begin{cases} 1 & \text{if } z < z_{s,max} \\ 0 & \text{if } z > z_{s,max} \end{cases} \quad (6)$$

In the example in which the impactor on average may penetrate approximately 10 cm into the 3D structure, $z_{s,max}$ corresponds to the first 10 cm into the 3D structure. $z_{s,max}$ may be controlled by $z_{ij,start}$ and $z_{ij,end}$. In some examples, the weighting function $W_{ij,s}(z)$ may have a linear or reciprocal behavior in relation to the z-value. This assigns the material property of the portion of the 3D structure first hit by the ray a higher weight relative to the material properties deeper into the 3D structure. In some examples, the weighting function $W_{ij,s}(z)$ can be defined by expression (7):

$$W_s(z) = \begin{cases} \dfrac{z_{s,max} - z}{z_{s,max}} & \text{if } z < z_{s,max} \\ 0 & \text{if } z > z_{s,max} \end{cases} \quad (7)$$

Another weighting method can be likewise implemented.

Typically, 3D structures are created from 3D solids, volume elements (e.g., CFD elements), and 2D surfaces. As a ray $\vec{r}_{ij,s}(z)$ traversed a structure, a specific material property $M_s(\vec{r}_{ij}(z))$ can be integrated. With respect to 3D solids and volume elements, a precise path length of the ray can be determined through a discretized volume element. The path length is multiplied by the material property (MatProp) for that discretized volume-element, for example, using expression (8):

$$M_s(\vec{r}_{ij}(z)) * \Delta z = \text{MatProp} * \Delta z \quad (8)$$

For 2D surfaces, a thickness is always associated to a given 2D surface. As such, two approaches can be implemented to determine material contribution. In a first approach, a simple accumulation can be performed while not taking into account an angle at which the ray $\vec{r}_{ij,s}(z)$ traverses the 2D surface. An example of such approach can be explained with expression (9):

$$M_s(\vec{r}_{ij}(z)) * \Delta z = \text{MatProp} * \text{thickness} \quad (9)$$

In a second approach, the angle between the ray and the surface normal is taken into account. An example of such approach can be explained with expression (10):

$$M_s(\vec{r}_{ij}(z)) * dz = \text{MatProp} * \text{thickness} \Big/ f\left( \dfrac{\vec{P}_{ij} - \vec{O}}{|\vec{P}_{ij,s} - \vec{O}|} * \vec{n} \right) \quad (10)$$

$f(x)$ is an approximation function such as but not limited to, $$f(x) = \dfrac{x + \varepsilon}{1 + \varepsilon}.$$

The approximation function $f(x)$ mitigates the singularity when the ray $\vec{r}_{ij}(z)$ and the 2D surface are parallel.

In some arrangements, the material property (MatProp) can include actual physical parameters of a material of the components at a given location, logical parameters of a material of the components at a given location, or a combination thereof. In some examples, the material property of specific material types can be 0 (MatProp=0), to allow a specific layers of the VXRI stack 300 to represent only specific material types.

In some examples, a material property can have positive effect if for instance the MatProp>threshhold and a negative effect if MatProp<threshhold A third type of VXRIs is indicative of a projection of a ray vector on a specific surface of the 3D structure, quantifying the angle with which an impactor from the direction of the ray vector would impact that structural element (e.g., the specific surface) of the 3D structure. An element of the third type can be referred to as $V_{ij,s}^{\alpha}$, which is a feature based on an impact angle. Two approaches can be used to determine the impact angle $V_{ij,s}^{\alpha}$, feature.

A first approach relates to determination of the impact angle $V_{ij,s}^{\alpha}$, feature based on the ray $\vec{r}_{ij}(z)$, for example, as shown in expression (11):

$$V_{ij,s}^{\alpha} = \vec{n}(\vec{r}(V_{ij,s}^{Z})) * \frac{\vec{P}_{ij} - \vec{O}}{|\vec{P}_{ij,s} - \vec{O}|} \quad (11)$$

A second approach relates to determination of the impact angle $V_{ij,s}^{\alpha}$ feature based on x, y contribution, for example, as shown in expressions (12) and (13). Using this approach, two VXRIs or layers can be determined: a first layer corresponds to a $\overrightarrow{\Delta x}$ direction (e.g., expression 12) while a second layer corresponds to $\overrightarrow{\Delta y}$ direction (e.g., expression (13)).

$$V_{ij,s}^{\alpha} = \vec{n}(\vec{r}(V_{ij,s}^{z})) * \overrightarrow{\Delta x} \quad (12)$$

$$V_{ij,s+1}^{\alpha} = \vec{n}(\vec{r}(V_{ij,s}^{z})) * \overrightarrow{\Delta y} \quad (13)$$

For either the first approach or the second approach, the term $\vec{n}(\vec{r}(V_{ij,s}^{z}))$ represents a normal vector with respect to a surface at a location defined by $V_{ij,s}^{z}$, which is defined by a z-value-based feature $V_{ij,s}^{Z}$. If no surface exists at that the location, then $\vec{n}(\vec{r}(V_{ij,s}^{z}))=0$. As described, $V_{ij,s}^{Z}$, is a layer that provides the z-value for a surface with specific features.

Figure 7:
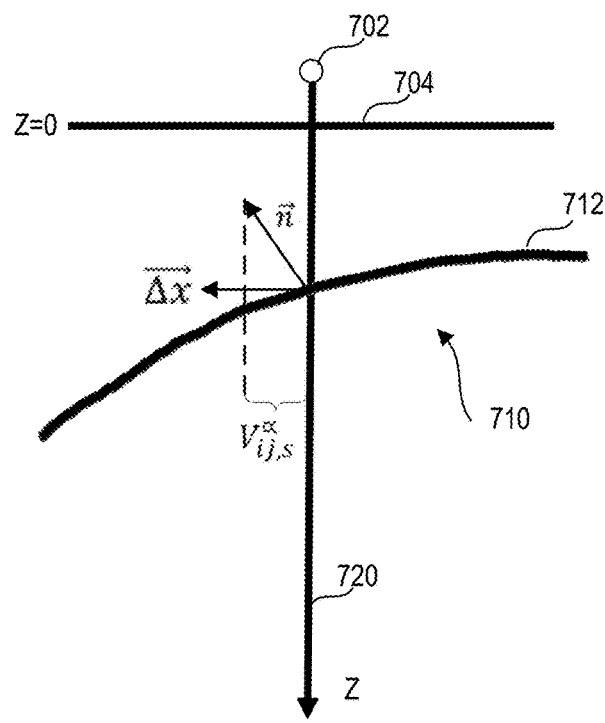
FIG. 7 is a diagram illustrating a projection of a ray vector on a specific surface of a 3D structure according to various arrangements.
Figure 8A:
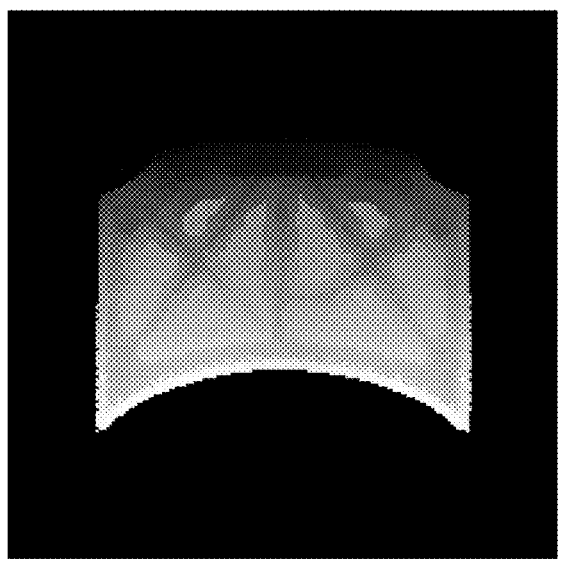
FIGS. 8A-8D are examples of VXRIs or layers of a VXRI stack according to various arrangements.
Figure 8B:
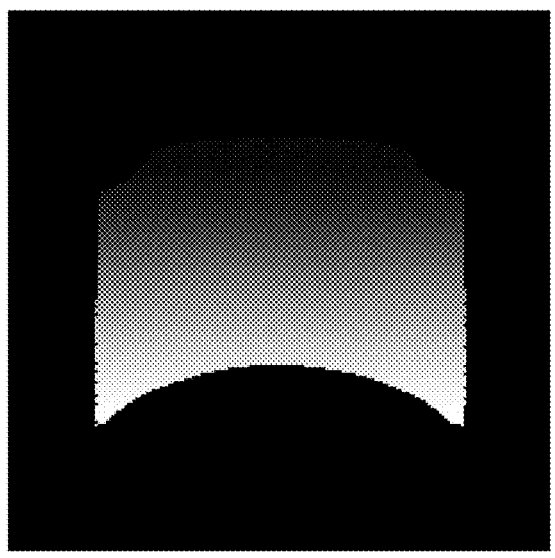
Figure 8C:
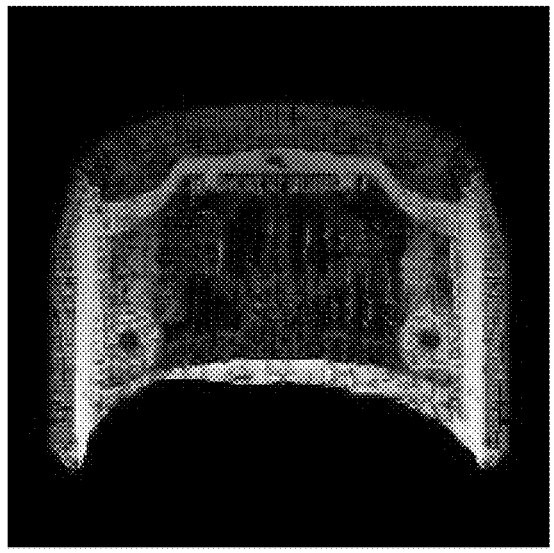
Figure 8D:
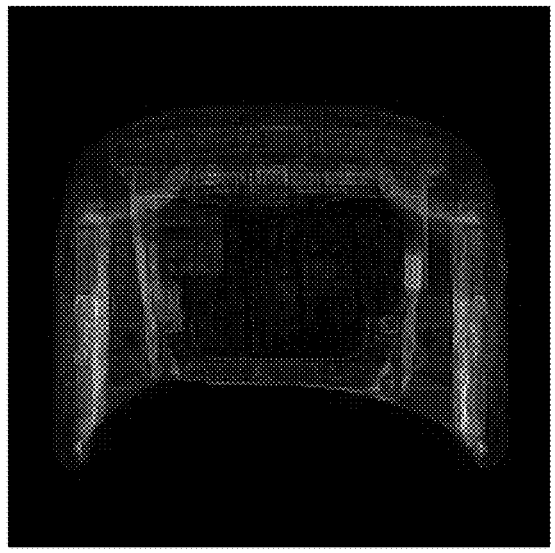

FIG. 7 is a diagram illustrating a projection of a ray vector on a specific surface of a 3D structure according to various arrangements. Referring to FIGS. 1-7, a structure 710 is shown to have a surface 712. A grid plane 704 is defined to be between an origin $\vec{O}$ 702 and the structure 710 (e.g., the surface 712). A ray $\vec{r}_{ij}(z)$ 720 defines a straight path from the origin $\vec{O}$ 702 to a grid point $\vec{P}_{ij}$ on the grid plane 704. The ray $\vec{r}_{ij}(z)$ 720 traverses the surface 712. $\vec{n}$ represents a normal vector with respect to the surface 712 at a location defined by $V_{ij,s}^{z}$. Based on $\overrightarrow{\Delta x}$ and $\vec{n}$, $V_{ij,s}^{\alpha}$ can be determined, for example, using the expression (12).

FIGS. 8A-8F are examples of VXRIs or layers 800a-800d of a VXRI stack according to various arrangements. Referring to FIGS. 1-8D, each of the layers 800a-800d is a monochrome image obtained by scaling values in a 2D matrix to a luminance value. The individual values of the 2D matrix correspond to pixels on the layers 800a-800d. While 6 layers are shown, one of ordinary skill in the art can appreciate that more of fewer layers can be present in a VXRI stack.

The layer 800a is indicative of depth at an upper hood profile of an automobile. The layer 800b is indicative of depth at a lower hood profile of the automobile. The layer 800c is indicative of depth at (distance between) the hood and an engine bay of the automobile. The layer 800d is indicative of material property of density distribution of the engine bay.

According to the foregoing, a basic set of parameters that depends on types of performance attributes can be used to create a VXRI stack indicative of key features. The VXRI stack can be used to train a machine learning algorithm or a neural network to predict simulation outcomes associated with the performance attributes. An area covered by the image or layer is defined to indicate a localness of an effect. An actual pixel-size is a technical element defined by the machine learning algorithm. The material properties to be considered are defined. Classifications of which components contribute to which feature are also defined. To further refine a layer, a weighting factor can be included to control the contribution based on the depth (z-value). Thus, a Weighting-Function $W_s(z)$ may be applied. $z_{max}$ and the shape of the weighting function can control how deep into the 3D structure specific features should be examined. The weighting function may be different for the different logical groups. If the path of the impactor is impacted by specific structures, then the ray-path can be refined. In some examples, the ray-path refinement is considered as a second refinement. Initially, parallel rays should be used. In some examples, the z-based feature $V_{ij,s}^{Z}$, can be used as a stencil for all other VXRI features, allowing selective extractions from features in clearly defined volumes of the 3D structure.

As such, the parameters described herein can be determined based on understanding of the basic engineering/physical effects that are in play. The disclosed arrangements are however completely independent of actual product structure, with the exception of partitioning the structure into subsystems.

The terms "system," "logic," "module," "data processing apparatus," or "computing device" encompasses all kinds of circuits, apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

The construction and arrangement of the systems and methods as shown in the various exemplary examples are illustrative only. Although only a few examples have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. Other substitutions, modifications, changes, and omissions can be made in the design, operating conditions and arrangement of the exemplary examples without departing from the scope of the present disclosure.

The present disclosure contemplates methods, systems and program products on any machine-readable media for accomplishing various operations. The examples of the present disclosure can be implemented using existing computer processors, or by a special purpose computer processor for an appropriate system, incorporated for this or another purpose, networked systems or by a hardwired system. Examples within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium.

Combinations of the above are also included within the scope of machine-readable media. Machine-executable instructions include, for example, instructions and data which cause a general purpose computer, special purpose computer, or special purpose processing machines to perform a certain function or group of functions. The machine-executable instructions can be executed on any type of computing device (e.g., computer, laptop, etc.) or can be embedded on any type of electronic device (e.g., a portable storage device such as a flash drive, etc.).

Although the figures can show a specific order of method steps, the order of the steps can differ from what is depicted. Also, two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision step.

What is claimed is:

1. A method for determining a training set for an Artificial Intelligence (AI) of a computerized simulation platform, comprising:
    generating an image stack corresponding to a 3D structure, wherein the image stack comprises a plurality of layers generated based on the 3D structure, and generating the image stack corresponding to the 3D structure comprises generating at least one first layer corresponding to a material property by integrating a weighted material property along a ray originating from an origin outside of the 3D structure through a grid point on a grid plane, from a predefined starting point to a predefined end point;
    performing computer simulation using a computer model of the 3D structure as input to determine simulation results;
    determining the training set for a machine learning algorithm of the AI, wherein the training set comprises the image stack and the simulation results; and
    training the AI using the machine learning algorithm based on the training set.

2. The method of claim 1, wherein training the AI using the machine learning algorithm based on the training set comprises providing the training set to the machine learning algorithm to identify correlations between the image stack and the simulation results.

3. The method of claim 1, wherein:
    each of the plurality of layers is represented by a 2D value matrix;
    each value in the 2D value matrix corresponds to a pixel; and
    the 2D value matrix is visualized as a monochrome image or color-coded by scaling values in the 2D value matrix.

4. The method of claim 1, wherein each of the plurality of layers is generated from a same perspective via a same origin.

5. The method of claim 1, wherein each of the plurality of layers corresponds to one of a depth measurement, a material property, or an impact angle.

6. The method of claim 1, wherein generating the image stack corresponding to the 3D structure comprises generating at least one first layer corresponding to a depth measurement by:
    integrating a weighted material property along the ray originating from the origin outside of the 3D structure through the grid point on the grid plane, from the predefined starting point to the predefined end point, to determine an integration result;
    in response to determining that the integration result exceeds a threshold, setting a value of the first layer that corresponds to the grid point as a z-value; and
    in response to determining that the integration result does not exceed the threshold, setting a value of the first layer that corresponds to the grid point as a default value.

7. The method of claim 1, wherein generating the image stack corresponding to the 3D structure comprises generating at least one first layer corresponding to a depth measurement based on a linear combination of other layers that indicate depth measurements.

8. The method of claim 1, wherein generating the image stack corresponding to the 3D structure comprises generating at least one first layer corresponding to an impact angle based on a normal vector with respect to a surface at a location defined by corresponding location on the first layer corresponding to a depth measurement.

9. The method of claim 1, wherein generating the image stack corresponding to the 3D structure comprises generating at least one first layer corresponding to an impact angle based on a normal vector with respect to a surface at a location defined by corresponding location on a first layer corresponding to a depth measurement.

10. The method of claim 1, wherein generating the image stack corresponding to the 3D structure comprises:
    generating at least one first layer corresponding to an impact angle based on a first delta with respect to a first axis and a normal vector with respect to a surface at a location defined by a corresponding location on a first layer, wherein the first layer corresponds to a depth measurement; and generating a fourth layer corresponding to the impact angle based on a second delta with respect to a second axis and the normal vector with respect to the surface at the location defined by the corresponding location on the first layer.

11. The method of claim 1, wherein each matrix location in one of the plurality of layers is aligned to a corresponding matrix location in another one of the plurality of layers.

12. The method of claim 1, further comprising predicting simulation results for another 3D structure using the AI.

13. A method for determining a training set for an Artificial Intelligence (AI) of a computerized simulation platform, comprising:

generating an image stack corresponding to a 3D structure, wherein the image stack comprises a plurality of layers generated based on the 3D structure;

performing computer simulation using a computer model of the 3D structure as input to determine simulation results;

determining the training set for a machine learning algorithm of the AI, wherein the training set comprises the image stack and the simulation results; and training the AI using the machine learning algorithm based on the training set, wherein generating the image stack corresponding to the 3D structure comprises projecting a ray through each grid point on a grid plane to the 3D structure, wherein each grid point corresponds to a same matrix location on each of the plurality of layers.

14. A method for determining a training set for an Artificial Intelligence (AI) of a computerized simulation platform, comprising:

generating an image stack corresponding to a 3D structure, wherein the image stack comprises a plurality of layers generated based on the 3D structure;

performing computer simulation using a computer model of the 3D structure as input to determine simulation results;

determining the training set for a machine learning algorithm of the AI, wherein the training set comprises the image stack and the simulation results; and training the AI using the machine learning algorithm based on the training set, wherein the image stack is generated based on material properties, depths, and impact angles that affect the simulation results.

15. A non-transitory computer-readable medium having computer-readable instructions, such that when executed, causes a processor to determine a training set for an Artificial Intelligence (AI) of a computerized simulation platform by:

generating an image stack corresponding to a 3D structure, wherein the image stack comprises a plurality of layers generated based on the 3D structure, and generating the image stack corresponding to the 3D structure comprises generating at least one first layer corresponding to a material property by integrating a weighted material property along a ray originating from an origin outside of the 3D structure through a grid point on a grid plane, from a predefined starting point to a predefined end point;

performing computer simulation using a computer model of the 3D structure to determine simulation results;

determining the training set for a machine learning algorithm of the AI, wherein the training set comprises the image stack and the simulation results; and training the AI using the machine learning algorithm based on the training set.

16. The non-transitory computer-readable medium of claim 15, wherein:

each of the plurality of layers is represented by a 2D value matrix;

each value in the 2D value matrix corresponds to a pixel; and the 2D value matrix is visualized as a monochrome or color-coded image by scaling values in the 2D value matrix.

17. The non-transitory computer-readable medium of claim 15, wherein each of the plurality of layers corresponds to one of a depth measurement, a material property, or an impact angle.

18. The non-transitory computer-readable medium of claim 15, wherein each matrix location in one of the plurality of layers is aligned to a corresponding matrix location in another one of the plurality of layers.

19. A computerized simulation platform configured to determine a training set for an Artificial Intelligence (AI), the computerized simulation platform comprises:

a processing circuit configured to:

generate an image stack corresponding to a 3D structure, wherein the image stack comprises a plurality of layers generated based on the 3D structure, and generating the image stack corresponding to the 3D structure comprises generating at least one first layer corresponding to a material property by integrating a weighted material property along a ray originating from an origin outside of the 3D structure through a grid point on a grid plane, from a predefined starting point to a predefined end point;

perform computer simulation using a computer model of the 3D structure to determine simulation results;

determine the training set for a machine learning algorithm of the AI, wherein the training set comprises the image stack and the simulation results; and train the AI using the machine learning algorithm based on the training set.

* * * * *